(12) United States Patent
Kim et al.

(10) Patent No.: US 7,576,812 B2
(45) Date of Patent: Aug. 18, 2009

(54) LIQUID CRYSTAL DISPLAY DEVICE AND METHOD FOR FABRICATING THE SAME

(75) Inventors: Jeong Hyun Kim, Kunpo-shi (KR); Hyun Sik Seo, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/826,003

(22) Filed: Jul. 11, 2007

(65) Prior Publication Data

US 2008/0018829 A1     Jan. 24, 2008

Related U.S. Application Data

(62) Division of application No. 09/891,534, filed on Jun. 27, 2001, now Pat. No. 7,248,309.

(30) Foreign Application Priority Data

Dec. 29, 2000  (KR) ................. 2000-86010

(51) Int. Cl.
    *G02F 1/1335*  (2006.01)
(52) U.S. Cl. ........................................ 349/69
(58) Field of Classification Search ............ 349/69
    See application file for complete search history.

(56) References Cited

U.S. PATENT DOCUMENTS

| 4,586,791 A | 5/1986 | Isogai et al. |
| 4,674,840 A | 6/1987 | Bennett |
| 4,772,885 A | 9/1988 | Uehara et al. |
| 5,504,599 A | 4/1996 | Okibayashi et al. |
| 5,763,110 A | 6/1998 | Hu et al. |
| 5,852,487 A | 12/1998 | Fujimori et al. |
| 6,361,885 B1 | 3/2002 | Chou |
| 6,403,238 B1 | 6/2002 | Horhold et al. |
| 6,507,379 B1 | 1/2003 | Yokoyama et al. |

FOREIGN PATENT DOCUMENTS

JP            10-078582            3/1998

*Primary Examiner*—James A Dudek
(74) *Attorney, Agent, or Firm*—McKenna Long & Aldridge

(57) ABSTRACT

A liquid crystal display (LCD) device includes a first substrate and a second substrate, an organic light emitting element formed by interposing a first insulating layer on an outer surface of the first substrate, a second insulating layer and a protective layer formed in order over an entire surface of the organic light emitting element, a thin film transistor formed on the first substrate, a passivation layer formed over an entire surface of the first substrate including the thin film transistor, a pixel electrode formed on the passivation layer to be connected to the thin film transistor, a common electrode formed on the second substrate, and a liquid crystal layer formed between the first substrate and the second substrate. A method for fabricating the LCD includes the steps of forming a first insulating layer on an outer surface of a first substrate, forming an organic light emitting element on the first insulating layer, forming a second insulating layer over an entire surface of the organic light emitting element, forming a protective layer on the second insulating layer, forming a thin film transistor on the first substrate, forming a passivation layer over an entire surface of the first substrate including the thin film transistor, forming a pixel electrode on the passivation layer, and forming a liquid crystal layer between the first substrate and a second substrate.

7 Claims, 4 Drawing Sheets

LIQUID CRYSTAL DISPLAY DEVICE AND METHOD FOR FABRICATING THE SAME

CROSS REFERENCES TO RELATED APPLICATIONS

This is a divisional application of application Ser. No. 09/891,534 filed 27 Jun. 2001 now U.S. Pat. No. 7,248,309, which claims the benefit of Korean Patent Application No. 2000-080610, filed 29 Dec. 2000, which is hereby incorporated by reference for all purposes as if fully set forth herein.

BACKGROUND OF THE INVENTION

1. Field of the Invention

The present invention relates to a display device, and in particular, to a liquid crystal display (LCD) device.

2. Description of the Related Art

An LCD is not a self-emissive light element but instead is a light receiving element necessitating an independent light source, and has a technical limitation in terms of brightness, contrast, angle of visual field, magnification of the view, etc. Therefore, efforts have been actively made to develop a novel flat display device. An example is research into an organic electroluminescent (EL) device that has merits such as operability with low voltage, self-emission of light, a compact and slim appearance, wide angle of visual field and a quick response.

The EL of an organic material was first discovered in single crystal Anthracene. Nevertheless, the first discovery failed to develop the EL device for more than the next 20 years due to its size limit and difficulty in growing the single crystal, as well as to an extremely high voltage (~1000V) required for its operation. Recently, however, a device has been developed having a film thickness of only 1000 Å and operable with a low voltage of about 10V.

An organic light emitting diode (OLED) comprises a cathode layer, an organic film layer, and an anode layer. The organic film layer comprises an electron transport layer, a hole transport layer, and an organic emitting layer. If necessary, an electron injection layer and a hole injection layer may be additionally comprised of the organic film layer.

An inorganic EL device is similar to a compound in its concept that a fluorescent material is emitted by electric energy. However, a slight difference lies in terms of the excitation, which is a core of the emitting mechanism. In the inorganic EL device, light emission is caused by energy generated by an acceleration and collision of electrons due to high voltage. In the organic EL device, however, light emission is caused by rebinding of the holes injected from an anode and a cathode with electrons.

The following is a detailed description of a conventional LCD made with reference to FIG. 1.

FIG. 1 is a sectional view of a conventional LCD illustrating a structure thereof.

Referring to FIG. 1, the conventional LCD comprises two insulating substrates 101, 101a facing each other and having liquid crystal sealed therebetween, color filter layers 102 of red, green and blue formed on the upper substrate 101 for expressing colors, and black matrices 103 for shielding penetration of light into the parts other than the pixel electrodes formed on the lower substrate 101a.

A common electrode 105 is formed to cover the color filter layers 102 and the black matrices. It is possible to form an overcoat 104 before forming the common electrode 105.

Thin film transistors consisting of a gate electrode 106 elongated from a gate line, a source electrode 107 and a drain electrode 108 elongated from a data line, which is arrayed to cross the gate line, are formed on the lower substrate 101a at regular intervals. A pixel electrode is connected to the drain electrode 108 through a contact hole. A backlight 112 is provided on an outer surface of the lower substrate 101a.

Spacers 109 are dispersed between the color filter layers and thin film transistors to maintain a cell gap.

However, the conventional LCD and its fabrication method pose the following problems.

An LCD is not a self-emissive light element but a light receiving element necessitating an independent light source, thereby requiring a backlight. The electric power consumed by the backlight occupies a dominant part of the electric power supplied to the LCD. Further, the backlight becomes a bar to reducing weight, thickness, length and size of the LCD.

SUMMARY OF THE INVENTION

It is, therefore, an object of the present invention to provide an LCD and a method for fabricating the same that can overcome the easy breakability of the conventional LCD by employing an organic light emitting diode as a backlight of the LCD to reduce the thickness thereof, and by using an organic material like polymer.

To achieve the above object, there is provided an LCD comprising: a first substrate and a second substrate; a light emitting layer formed on an outer surface of the first substrate; a thin film transistor and a pixel electrode formed on the first substrate; a common electrode formed on the second substrate; and a liquid crystal layer formed between the first substrate and the second substrate.

There is also provided a method for fabricating an LCD, comprising the steps of: preparing a first substrate and a second substrate; forming a light emitting layer on an outer surface of the first substrate; forming a thin film transistor and a pixel electrode formed on the first substrate; and a liquid crystal layer between the first substrate and the second substrate.

The light emitting layer comprises a first insulating layer, an organic light element, and a second insulating layer. The organic light element comprises a first electrode, a hole transport layer, an organic light emitting layer, electron transport layer, and a second electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The advantageous effects of the present invention include overcoming the easy breakability of the conventional LCD by employing an organic light emitting diode as a backlight of the LCD to reduce the thickness thereof, and by using an organic light element as a substitute for a backlight, thereby reducing weight, thickness, length and size of the LCD and enhancing efficiency of electric power.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
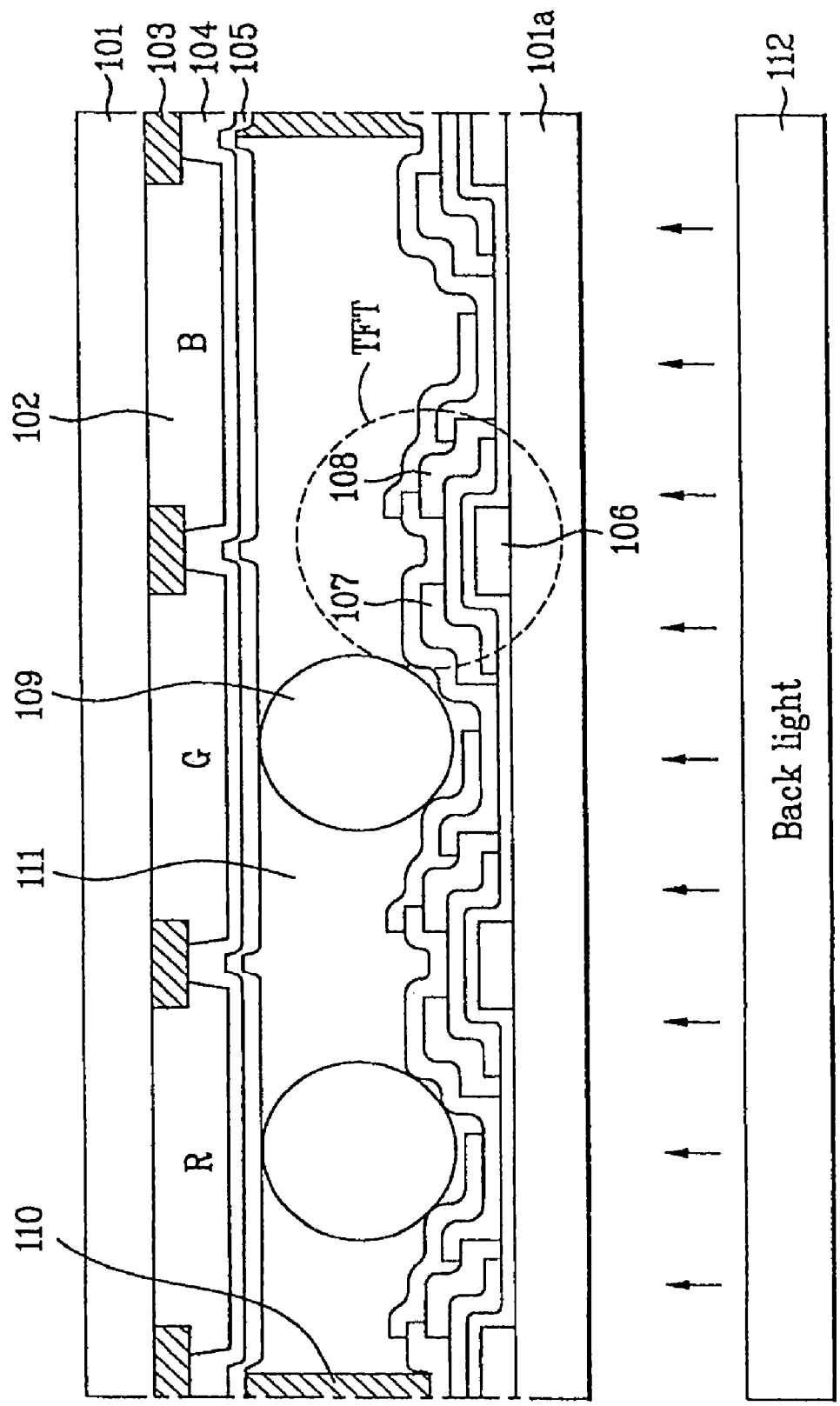
FIG. 1 is a sectional view of a conventional LCD illustrating a structure thereof.
Figure 2:
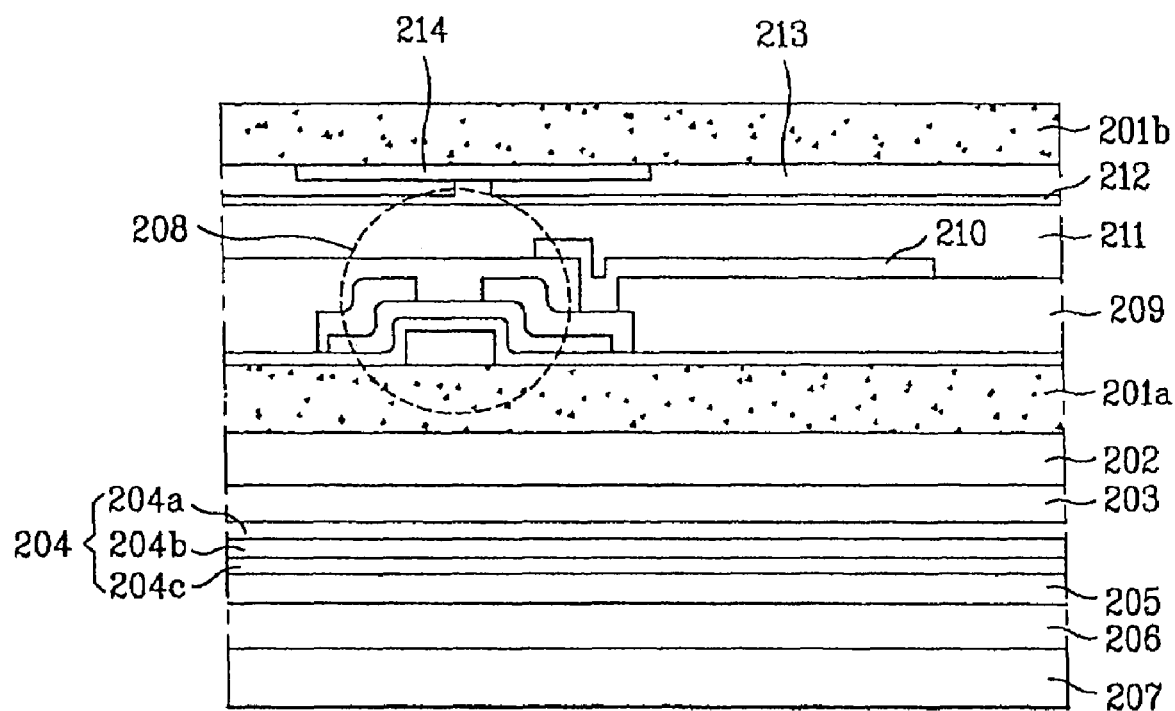
FIG. 2 is a sectional view of an LCD according to a preferred embodiment of the present invention illustrating a structure thereof.

FIG. 2 is a sectional view of an LCD according to a preferred embodiment illustrating a structure thereof.

Referring to FIG. 2, the LCD comprises two insulating substrates 201a, 201b facing each other having liquid crystal 211 sealed therebetween. A first insulating layer 202 is formed on an outer surface of the insulating substrate 201a. An anode 203 of indium tin oxide (ITO) material is formed on the first insulating layer 202. An organic film layer 204 is formed on the anode 203. The organic film layer 204 comprises a hole transport layer(204a), an organic light emitting layer(204b), and an electron transport layer(204c). A cathode 205 of Mg or Li material is formed on the organic film layer. A second insulating layer 206 is formed on the cathode 205, and a protective layer 207 is formed on the second insulating layer 206.

Here, the first substrate 201a is of polymer such as polycarbonate (PC), polyimide, polyethersulphone (PES), polyacrylate (PAR), polyethylenenaphthelate (PEN), or polyethyleneterephehalate (PET) having flexibility that can avoid easy breakability of the conventional glass substrate. The first substrate 201a and the second substrate 201b perform an additional function of polarization deriving from the molecular array of a macromolecular organic material.

Sheet glass of a predetermined thickness is formed on an outer surface of the first substrate 201a before the first insulating layer 202 is formed so as to shape the polymer substrate.

Meanwhile, a thin film transistor 208 comprising a gate electrode, a gate insulating film, a semiconductor layer, a source electrode, and a drain electrode is formed on an upper portion of the first substrate 201a by undergoing a series of processes. A passivation layer 209 is laminated over the entire surface including the thin film transistor 208. Pixel electrodes 210 are formed on the passivation layer 209 at predetermined intervals.

A common electrode 212 is formed on the second substrate 201b. Color filter(213) layers as well as black matrices(214) may be additionally comprised to express colors and to shield penetration of light into the thin film transistor 208 of the first substrate 201a, respectively.

FIGS. 3A to 3D are views of an LCD according to the preferred embodiment illustrating a method for fabricating the same.

Figure 3A:
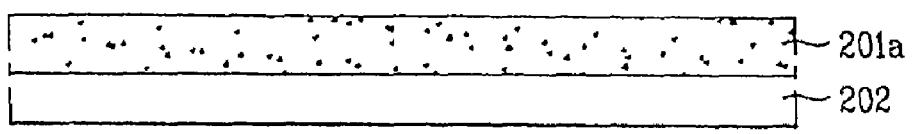
FIGS. 3A to 3D are views of an LCD according to a preferred embodiment of the present invention illustrating a method for fabricating the same.

As shown in FIG. 3A, the first insulating layer 202, preferably composed of $SiO_2$ or SiNx, is formed on an outer surface of the first substrate 201a.

Figure 3B:
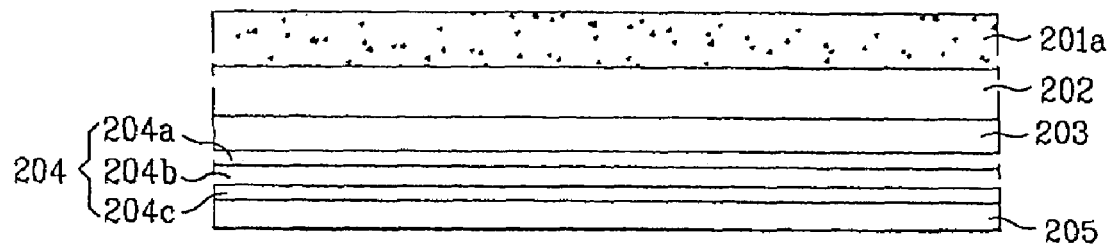

As shown in FIG. 3B, an ITO film is deposited on the first insulating layer 202 by means of sputtering to form the anode 203. Thereafter, the organic film layer 204 is formed on the anode 203 by forming a hole transport layer(204a), an organic light emitting layer(204b) and an electron transport layer(204c) successively by means of vacuum deposition or spin coating of an organic material such as Alq3 (tris-8-hydroxyquinolinato aluminum), BeBq (bis-benzo-quinolinato-berellium), PPV (polyphenylenevinylene) or polyalkylthiphene. The organic material should satisfy the following characteristics: a high fluorescent quantum yield under solid state; a high mobility of electrons and holes; and uneasy decomposability during vacuum deposition; an evenly formed film; and a film with a stable structure.

The cathode 205 is formed on the organic film layer 204 by depositing a conductive material, preferably a metallic material such as Mg, Li or a compound of Mg and Li, by means of sputtering.

Figure 3C:
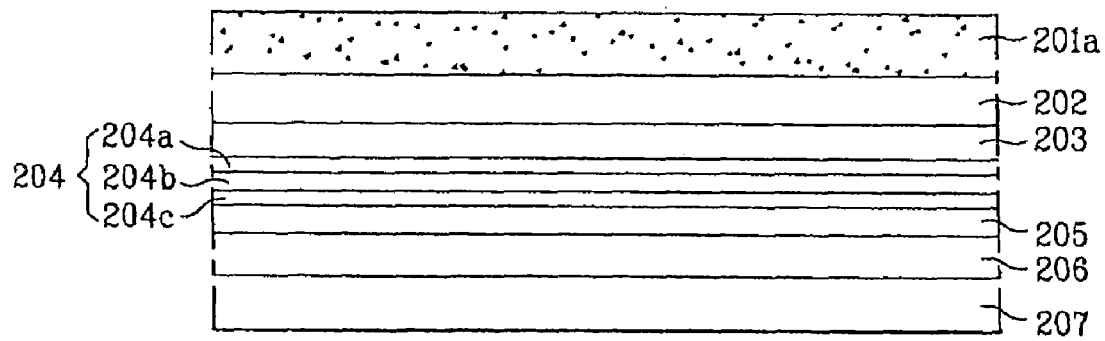

As shown in FIG. 3C, the second insulating layer 206 is formed on the cathode 205, and the protective layer 207 is subsequently formed thereon to prevent deterioration of the cathode 205 caused by moisture and oxygen. The protective layer is preferably composed of $SiO_x$ or $IO_x$.

Figure 3D:
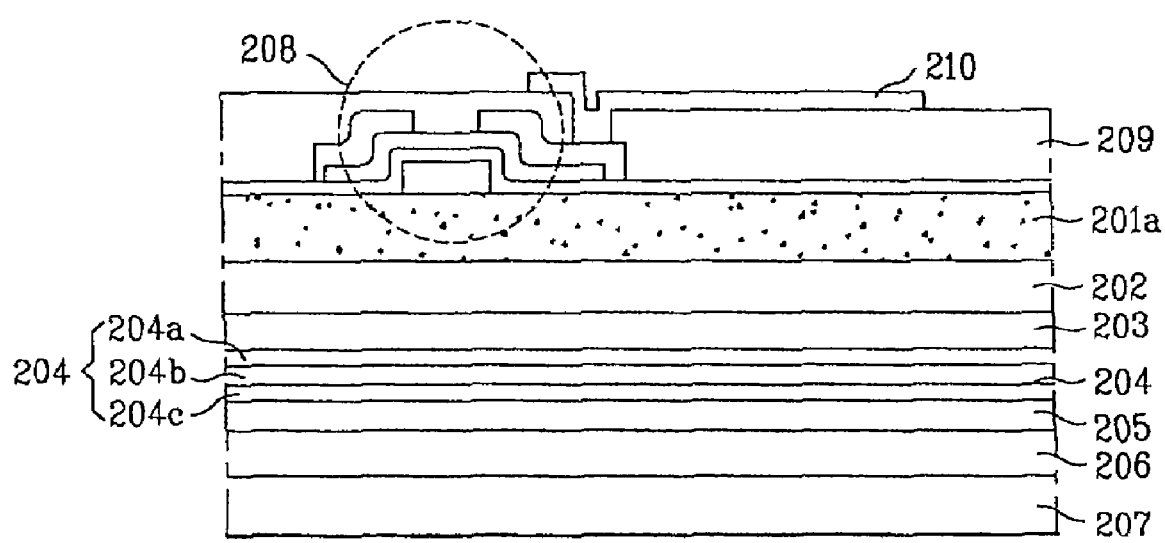

As shown in FIG. 3D, the thin film transistor (TFT) 208 comprising a gate electrode, a gate insulating film, a semiconductor layer, a source electrode, and a drain electrode is formed on the first substrate by undergoing a series of processes. The passivation layer 209 is laminated over the entire surface including the thin film transistor 208. Thereafter, pixel electrodes 210 are formed on the passivation layer 209 at predetermined intervals.

Though not shown in the drawing, the fabrication of the LCD is completed by disposing the first substrate 201a, on which the organic light emitting diode has been formed, and the second substrate 201b as well as by injecting liquid crystal therebetween.

Meanwhile, the method for fabricating the LCD according to the preferred embodiment may comprise the steps of forming an active region on the first substrate, and forming the organic light emitting diode on an outer surface of the first substrate. The method may further comprise the steps of disposing the first substrate and the second substrate, and forming the organic light emitting diode.

As described above, an LCD and a method for fabricating the same as disclosed herein have the following advantageous effects.

The LCD as disclosed herein is much slimmer than the conventional LCD owing to an employment of an organic light emitting diode as a backlight. Also, the LCD as disclosed herein is not liable to be broken owing to an employment of an organic material for the substrates. Further, the polarizing function in the substrates of the LCD as disclosed herein does not necessitate any polarized plate, thereby serving to simplify the fabricating process.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for fabricating a liquid crystal display (LCD) device, comprising:

depositing an inorganic insulating layer on a first surface of a first substrate, wherein the inorganic insulating layer is made of one of silicon oxide and silicon nitride;

after depositing the inorganic insulating layer, sequentially depositing a first electrode on the inorganic insulating layer, an organic light emitting layer on the first electrode and a second electrode on the organic light emitting layer to form an organic light emitting diode;

after forming the organic light emitting diode, depositing a protective layer to protect the organic light emitting diode;

forming a thin film transistor array for a liquid crystal display panel on a second surface of the first substrate;

providing a liquid crystal layer for the liquid crystal display panel on the second surface of the first substrate; and attaching the first substrate to a second substrate for the liquid crystal display panel, wherein the liquid crystal panel and the organic light emitting diode use the first substrate in common.

2. The method of claim 1, wherein forming the organic light emitting layer comprises:

forming a hole transport layer;

forming an light emitting layer; and forming an electron transport layer.

3. The method of claim 2, wherein the organic light emitting layer comprises any one of Alq3 (tris-8-hydroxyquinolinato aluminum), BeBq (bis-benzo-quinolinato-berellium), PPV (polyphenylenevinylene) or polyalkyithiphene.

4. The method of claim 1, wherein the first electrode is indium tin oxide.

5. The method of claim 1, wherein the first substrate is comprised of an organic material.

6. The method of claim 5, wherein the first substrate performs an additional function of polarization.

7. The method of claim 1, wherein the protective layer includes SiOx or IOx.

* * * * *